W. R. SMITH.
SPRING STRUCTURE.
APPLICATION FILED FEB. 16, 1921.

1,399,028.

Patented Dec. 6, 1921.
2 SHEETS—SHEET 1.

Inventor
Watson R. Smith

Witness:
Robert F. Beck

By
Attorney

W. R. SMITH.
SPRING STRUCTURE.
APPLICATION FILED FEB. 16, 1921.

1,399,028.

Patented Dec. 6, 1921.
2 SHEETS—SHEET 2.

Witness
Robert F. Beck

Inventor
Watson R. Smith
By
Attorney

UNITED STATES PATENT OFFICE.

WATSON R. SMITH, OF JACKSON, MICHIGAN.

SPRING STRUCTURE.

1,399,028.                    Specification of Letters Patent.         Patented Dec. 6, 1921.

Application filed February 16, 1921. Serial No. 445,516.

*To all whom it may concern:*

Be it known that I, WATSON R. SMITH, a citizen of the United States, residing at Jackson, in the county of Jackson and State of Michigan, have invented new and useful Improvements in Spring Structures, of which the following is a specification.

This invention relates to spring structures.

One object of the invention resides in the provision of a spring structure, embodying among other characteristics, a base frame strip to which the facing or skirt of the upholstering material may be readily secured and to which base frame strip the spring supporting bars may also be readily detachably secured.

Another object of the invention resides in the provision of a spring supporting bar or a plurality of spring supporting bars constructed whereby after the mounting of the springs on the bar or bars, the same may be readily let down into the frame and effectually detachably connected to the base frame strip.

A still further object resides in the provision of a spring supporting bar for the mounting of the springs and which is so constructed that after the springs have been secured to the bar, the bar, with the springs thereon, may be readily detachably connected to the base frame strip.

It is still further designed to provide a structure wherein the spring supporting bar is sprung into engagement with the base frame strip.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the drawings:—

Figure 1:
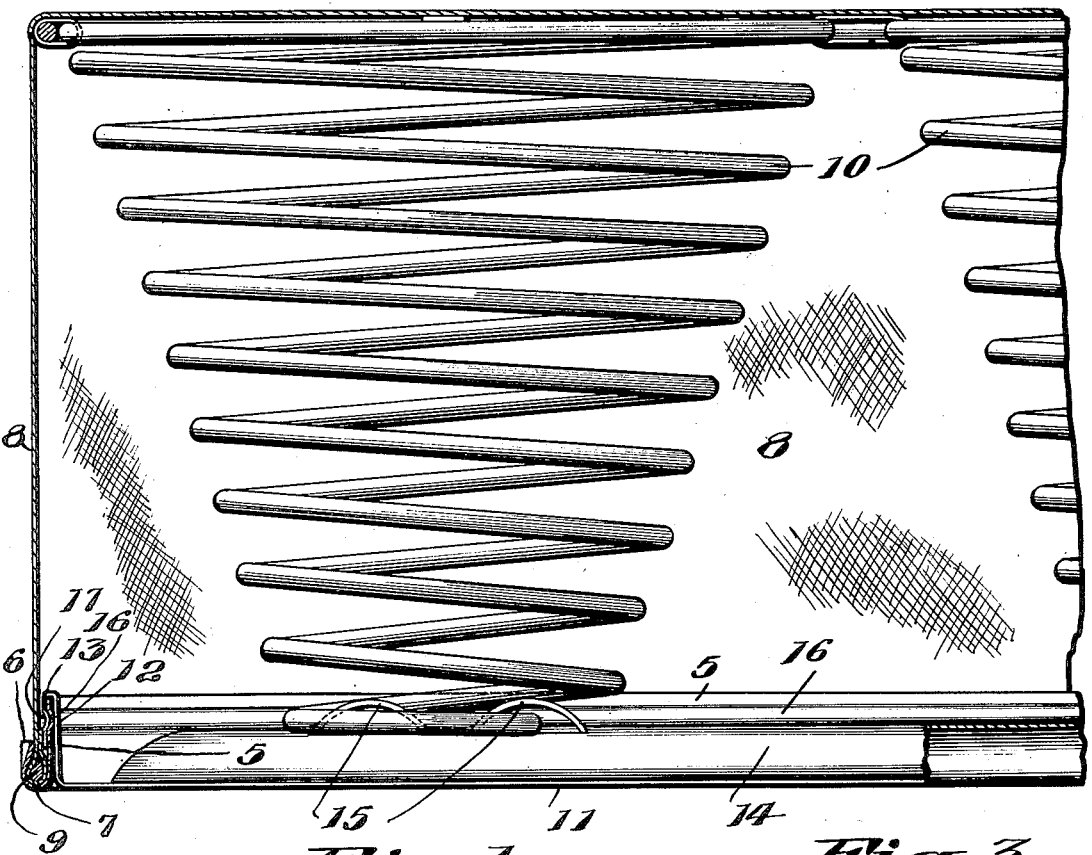
Figure 1 is a transverse sectional view through a portion of a spring structure illustrating one embodiment of the present invention.
Figure 3:
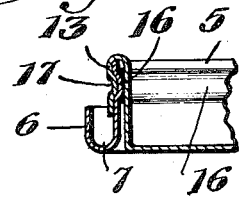
Fig. 3 is a slightly enlarged detail sectional view illustrating the connection between the spring supporting bars and the base frame.
Figure 2:
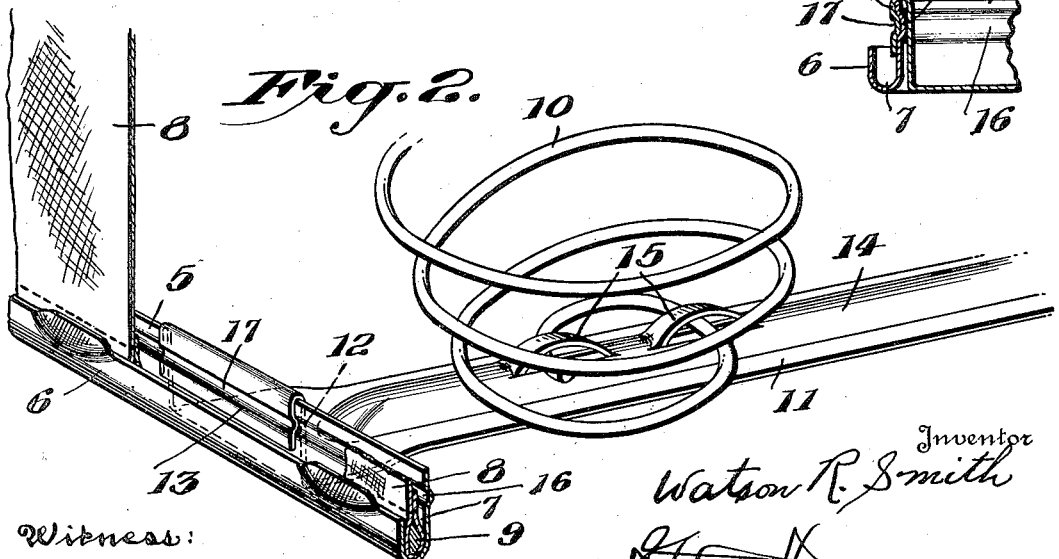
Fig. 2 is an enlarged detail fragmentary perspective view illustrating a portion of the base frame and a portion of one of the spring supporting bars having a spring mounted thereon.

Referring now more particularly to the accompanying drawings, the reference character 5 indicates a base frame strip of sheet or other metal, provided along its lower edge with an outwardly and upwardly directed flange 6, forming a groove 7 adapted to receive the lower edge of the skirt or upholstering facing 8.

Whether the lower edge of the facing is reinforced by a wire cord or the like 9, as shown, the lower edge of the facing is inserted in said groove 7 and held therein by forcing the flange 7 against or toward the outer face of the body of the base strip. If desired, the flange 6 may be pressed against or toward the body of the base strip or the base strip and flange may be compressed together in any suitable manner by the use of any suitable tools or instrumentalities.

Springs 10 of the single cone variety are shown as mounted upon suitable spring supporting bars 11. These spring supporting bars are preferably formed of sheet metal having spatulate-shaped ends, each end being directed upwardly as at 12 and then downwardly, as at 13 in spaced relation to the respective part 12 so as to form a hook at each end of each bar adapted to be readily slipped over the upper edge of the base strip. While these hook shaped ends of the spring supporting bars provide for a ready connection of the bars with the base strip and will permit of a slight sliding movement of the bars laterally, the hook ends, when once placed in the structure, have such close fit with the base strip as to maintain proper position with relation to the base strip for the support of the springs, the springs being sometimes and generally tied together in various ways.

One of the features of the present invention goes to the mounting of a series of the springs 10 on each spring supporting bar so that after the springs have been mounted the respective bars with the springs thereon may be readily inserted within and connected to the base frame or strip, thereby facilitating assembling of the structure. In the present instance, the supporting bars are shown as having a longitudinal rib 14 pressed or otherwise formed therein with this rib manipulated in any suitable manner to form pairs of spaced loops or eyes adapted to receive the lower or minor end of the conical springs to effect the connection of the springs with the respective bars. It will be understood, however, that these spring supporting bars may have any other suitable formation and that the springs may be connected thereto in any suitable manner so long as the bars have their hooked ends adapted to connect with the base frame strip in the manner hereinbefore described. By virtue of such a structure, it will be observed that the springs are not directly connected with the base frame or strip and it is not the purpose of the invention to have the spring supporting bars connected to the base frame strip by a pressing, pinching or other similar action. Rather than affect a permanent connection of the springs or the spring supporting bars with the base frame strip, the structure is such that the springs and their supporting bars may have detachable and ready disconnection with relation to the base frame strip when desired.

In assembling the structure, the base frame is formed and the spring supporting bars with the springs mounted on the same have their hooked ends positioned to overhang the upper edge of the base frame strip with the hooks concealed within the structure by the skirt or facing 8 which latter may be readily secured to the base frame strip after assembling the elements embodying the spring structure. If desired, the side facings could be secured to the base frame strip prior to the positioning of the spring supporting bars within the frame.

If desired, the base frame strip 5 may have a longitudinal groove 16 formed therein. This groove, if employed, is arranged preferably intermediate the edges of the strip 5 and is preferably pressed therein. If this groove 16 is adopted, the outer parts 13 of the hooks of the spring supporting bars may each have a hump pressed or otherwise formed therein adapted to spring into the groove 16 whereby to prevent any possibility of accidental disconnection of the spring supporting bars from the base frame.

Figure 4:
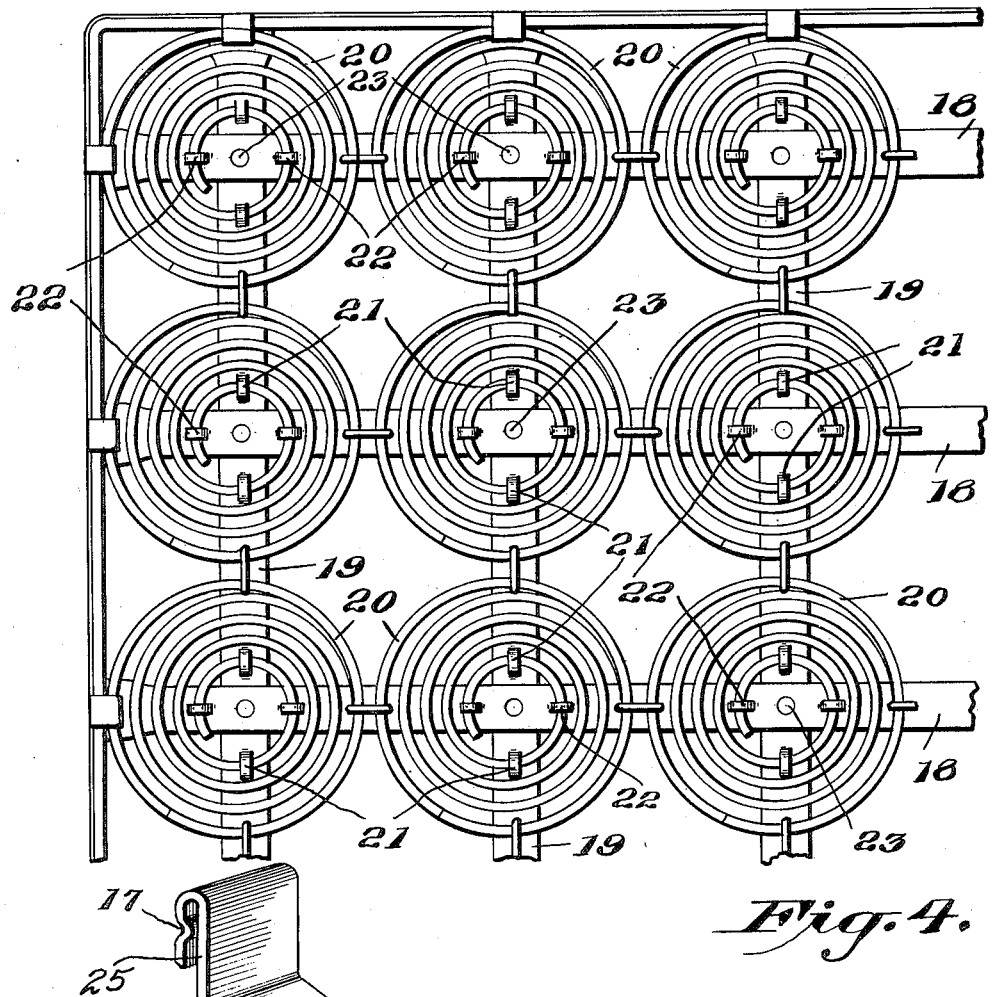
Fig. 4 is a detail fragmentary top plan view illustrating a modified form of means for connecting the springs to the supporting bars.
Figure 5:
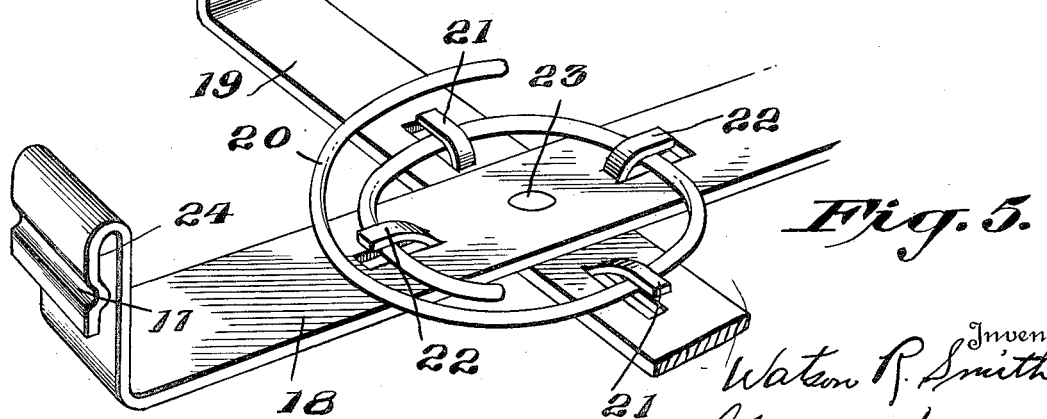
Fig. 5 is an enlarged fragmentary perspective view illustrating the modified means for connecting the springs to the spring supporting bars.

In another embodiment of the invention, there is shown in Figs. 4 and 5, a longitudinal sheet metal or other spring supporting bars 18, intersected by transversely arranged bars 19. Springs 20 are mounted upon these bars 18 and 19 at the points of intersection. This connection may be effected by pairs of tongues 21 struck up from the transverse bars 19 and by pairs of coöperating tongues 22 struck up from the longitudinal supporting bars 18, whereby in effecting the connection of the springs with the supporting bars the supporting bars are also tied together as will be readily appreciated by reference to the accompanying drawings. If desired, the transverse and longitudinal supporting bars may be further connected together by means of suitable rivets 23 at the points of intersection. In any event, both the longitudinal and the transverse bars each have each end provided with hooks 24 and 25 of the form hereinbefore described. This structure permits of the mounting of the springs on the supporting bars 18 and 19 and after thus mounting the springs on said bars, the structure thus formed, as a unit, may be let down into the base frame strip and the connection with the base frame effected by the hooks at the ends of the bars engaging over the base frame strip as hereinbefore described and as should now be well understood.

In this last described modification, the springs may be of the single or double cone type, as will be understood.

What is claimed is:—

1. In a spring structure, a sheet metal base frame strip provided with an external groove, and a spring supporting bar provided with a hook at each end adapted to detachably overhang the upper edge of the base frame strip, each hook being provided with a hump adapted to spring into said external groove.

2. In a spring structure, a metallic base frame strip provided with an external groove, and a spring supporting bar provided at each end with an inverted U-shaped hook adapted to detachably overhang the upper edge of the base frame strip, each hook being provided with a hump to engage in said external groove to effect a detachable connection between the strip and hook.

3. In a spring structure, a base frame strip provided at its lower edge with an external groove and having a longitudinal groove in its outer face intermediate its edges, and a spring supporting bar provided with a hook at each end with each hook provided with a hump adapted to spring over the upper edge of the base frame strip and into said second mentioned groove.

4. In a spring structure, a base frame strip provided with a groove to receive upholstering material, spring supporting means provided with hooks whereby to detachably overhang the upper edge of the base frame strip when the spring supporting means is let down into the base frame strip, and means between the hooks and strip whereby to effect a locking detachable connection between the hooks and the strip.

5. In a spring structure, a base frame strip, a spring supporting bar provided at each end with a hook adapted to engage over the upper edge of the strip so as to support the bar from the strip, and means between the strip and the hooks whereby to permit of adjustment of the bar longitudinally along the strip and yet provide an interlocking connection between the strip and the hooks to prevent accidental lifting of the hooked ends of the bar upwardly off of the strip.

6. In a spring structure, a metallic base frame strip, and a spring supporting bar provided at each end with an inverted U-shaped hook adapted to snap into interlocking detachable connection with the base frame strip and yet permit adjustment of the bar longitudinally along the base frame strip.

7. In a spring structure, a base frame strip, a spring supporting bar provided at each end with a portion engaging over the upper edge of the strip so as to support the bar from the strip, and a tongue and groove connection between the strip and the bar whereby to permit of adjustment of the bar longitudinally along the strip and yet provide an interlocking connection between the strip and the bar to prevent accidental lifting of the ends of the bar upwardly off of the strip.

In testimony whereof I have hereunto affixed my signature.

WATSON R. SMITH.